United States Patent
Sakai et al.

(10) Patent No.: US 6,460,374 B2
(45) Date of Patent: *Oct. 8, 2002

(54) METHOD OF MANUFACTURING GLASS-IMPREGNATED FIBER-REINFORCED CERAMIC

(75) Inventors: Akihito Sakai, Gifu (JP); Jun Gotoh, Kakamigahara (JP); Keiichi Tsugeki, Kakamigahara (JP); Masaki Shibuya, Ube (JP); Yasuhiro Shioji, Ube (JP)

(73) Assignees: Kawasaki Jukogyo Kabushiki Kaisha, Kobe (JP); Ube Industries, Ltd., Ube (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/451,516

(22) Filed: Nov. 30, 1999

(65) Prior Publication Data

US 2001/0037659 A1 Nov. 8, 2001

Related U.S. Application Data

(62) Division of application No. 09/041,681, filed on Mar. 13, 1998, now Pat. No. 6,071,603.

(30) Foreign Application Priority Data

Mar. 19, 1997 (JP) .............................................. 9-67045

(51) Int. Cl.$^7$ ................................................. C03B 8/02
(52) U.S. Cl. ............................. 65/17.2; 165/34; 165/45; 427/397.7; 427/397.8; 427/398.1; 427/452
(58) Field of Search ............................. 65/17.2, 34, 45; 427/397.7, 397.8, 398.1, 452; 428/34.5, 428

(56) References Cited

U.S. PATENT DOCUMENTS

| | | | | |
|---|---|---|---|---|
| 4,341,826 A | * | 7/1982 | Prewo et al. ............. | 123/193.1 |
| 4,435,455 A | * | 3/1984 | Prewo et al. .............. | 42/76.02 |
| 5,102,698 A | | 4/1992 | Cavalier et al. | |
| 5,622,751 A | | 4/1997 | Thebault et al. | |
| 5,702,787 A | * | 12/1997 | Andersen et al. .......... | 428/36.4 |
| 5,725,955 A | | 3/1998 | Tawil et al. | |
| 5,851,647 A | * | 12/1998 | Foster .................... | 428/304.4 |

FOREIGN PATENT DOCUMENTS

| | | |
|---|---|---|
| EP | 0 452275 A1 | 10/1991 |
| JP | 57-123878 | 8/1982 |
| JP | 3-79313 | 12/1991 |
| JP | A-8-157271 | 6/1996 |

* cited by examiner

Primary Examiner—Sean Vincent
(74) Attorney, Agent, or Firm—Oliff & Berridge, PLC

(57) ABSTRACT

A glass-impregnated, fiber-reinforced ceramic comprises a ceramic matrix having open voids, inorganic fibers embedded in the ceramic matrix in a regular or irregular orientation, and a glass matrix filling up the open voids in the ceramic matrix. The glass-impregnated, fiber-reinforced ceramic is manufactured by a manufacturing method comprising the steps of forming a fiber-reinforced ceramic comprising the ceramic matrix having open voids, and inorganic fibers embedded in the ceramic matrix, impregnating the fiber-reinforced ceramic with a glass precursor solution containing a glass precursor to stop up the open voids of the ceramic matrix with the glass precursor solution, and subjecting the fiber-reinforced ceramic impregnated with the solution to a heat treatment.

20 Claims, 4 Drawing Sheets

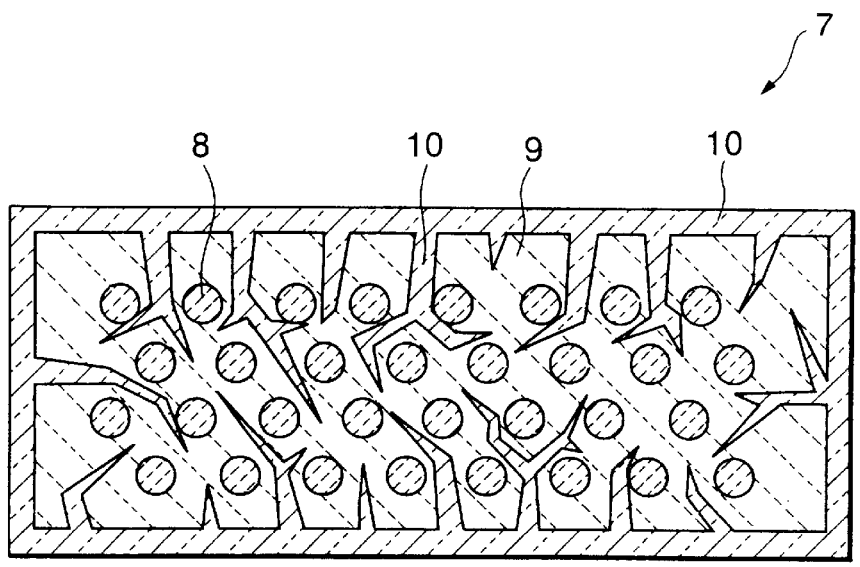
FIG. 1
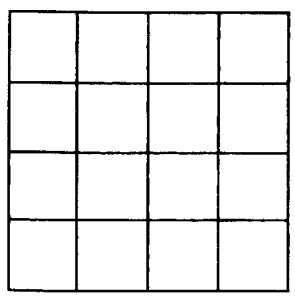  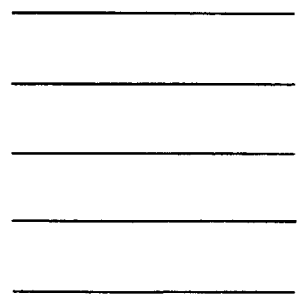  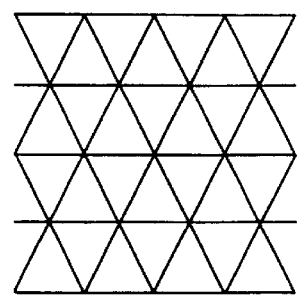
FIG. 2A  FIG. 2B  FIG. 2C

METHOD OF MANUFACTURING GLASS-IMPREGNATED FIBER-REINFORCED CERAMIC

This is a Division of application Ser. No. 09/041,681 filed Mar. 13, 1998, now is U.S. Pat. No. 6,071,603. The entire disclosure of the prior application(s) is hereby incorporated by reference herein in its entirety.

BACKGROUND OF THE INVENTION

1. Field of the Invention

The present invention relates to a glass-impregnated fiber-reinforced ceramic suitable for use in a hot oxidizing atmosphere, and a method of manufacturing the same.

2. Description of the Related Art

Ceramics have become watched as lightweight, highly heat-resistant structural materials in recent years owing to their excellent heat resistance superior to that of metals, and their high specific strength. However, there are still problems in using ceramics as structural materials in respect of reliability because ceramics have low toughness as compared with that of metals. Efforts have been made for the development of fiber-reinforced ceramic composite materials having high toughness as well as the excellent characteristics of ceramic materials.

Generally, the toughness of a fiber-reinforced ceramic (hereinafter referred to sometimes as "FRC") is most greatly dependent on the bonding strength of the interface between the fibers and the matrix of the FRC. The toughness is high if the bonding strength of the interface between the fibers and the matrix is low, and is low if the bonding strength of the interface between the fibers and the matrix is high. Such a characteristic of toughness is considered to be due to a fact that energy is consumed in extracting the fibers from the matrix if the bonding strength of the interface between the fibers and the matrix is low. Accordingly, when producing an FRC having a high toughness, the bonding strength of the interface between the fibers and the matrix of the FRC is reduced properly by, for example, coating the fibers.

The fiber-reinforced ceramic has a ceramic matrix, and inorganic fibers, i.e., reinforcing material, embedded in the ceramic matrix, and the ceramic matrix and the inorganic fibers are chosen out of various materials. The following are representative FRC manufacturing methods.

(a) Method which molds a mixture of fibers and a ceramic precursor, namely, a substance which can be converted into a ceramic material by thermal decomposition, in a molding and fires the molding.

(b) Method which forms a structure only from fibers, impregnates the structure with a ceramic precursor, and fires the structure impregnated with the ceramic precursor (Japanese patent application unexamined laid open No. 8-157271).

(c) Method which forms a structure only from fibers, impregnates the structure with a molten ceramic material, and fires the structure impregnated with the molten ceramic material.

Fiber-reinforced ceramics having excellent heat resistance, high specific strength and high toughness as mentioned above are used widely for various purposes. However, the following problems arise when conventional FRCs are used a hot oxidizing atmosphere.

Referring to FIG. 5 showing a fiber-reinforced ceramic 1 manufactured by a conventional method in a typical sectional view, the fiber-reinforced ceramic 1 has a ceramic matrix 4, and inorganic fibers 3 embedded in the ceramic matrix 4, and the ceramic matrix 4 has voids 5 which develop unavoidably during a manufacturing process. If the inorganic fibers 3 are, for example, silicon carbide fibers, the ceramic matrix 4 is silicon carbide, and the FRC 1 is heated at 1200° C. in the atmosphere, oxygen permeates the FRC through the voids 5, reaches the interfaces between the silicon carbide fibers and the silicon carbide matrix, and oxidizes the silicon carbide fibers and the silicon carbide matrix to produce $SiO_2$ glass in the interfaces. The $SiO_2$ glass formed in the interfaces bonds the silicon carbide fibers and the silicon carbide matrix firmly together, which reduces the toughness of the FRC 1 greatly. Therefore, the strength at elevated temperature of the FRC 1 in an oxidizing atmosphere or the strength of the same after the FRC 1 has been exposed to an oxidizing atmosphere is reduced greatly. Such a phenomenon is a problem common to FRC 1 consisting of easily oxidizable components. The notch effect of the voids 5 reduces the strength of the conventional FRC 1.

The conventional art method proposed to solve the foregoing problem in Japanese patent application unexamined laid open No. 8-157271 coats the surface of an FRC with glass. This method improves the oxidation resistance and the room temperature strength of the FRC by the sealing effect of the glass. However, the properties of the FRC manufactured by this method are still below the level of properties required of structural materials for use in a hot oxidizing atmosphere.

SUMMARY OF THE INVENTION

The inventors of the present invention found through elaborate studies of the foregoing problems that the foregoing problem can be solved by impregnating the conventional fiber-reinforced ceramic with glass so that the voids are filled up with the glass and have made the present invention on the basis of the knowledge acquired through the studies.

The present invention has been made to solve the foregoing problems and it is therefore an object of the present invention to provide a glass-impregnated, fiber-reinforced ceramic having excellent oxidation resistance in a hot oxidizing atmosphere and high room temperature strength.

Another object of the present invention is to provide a method of manufacturing a glass-impregnated, fiber-reinforced ceramic having excellent oxidation resistance in a hot oxidizing atmosphere and high room temperature strength.

According to a first aspect of the present invention, a glass-impregnated, fiber-reinforced ceramic including a ceramic matrix having voids opening outside; inorganic fibers embedded in the ceramic matrix; and a glass matrix with which the voids of the ceramic matrix are filled.

When the glass-impregnated, fiber-reinforced ceramic is placed in a hot oxidizing atmosphere, the ceramic matrix and the inorganic fibers embedded in the ceramic matrix are insulated from oxygen contained in the hot oxidizing atmosphere because at least the voids in the ceramic matrix are filled up with the glass matrix. Therefore, even if the ceramic matrix and the inorganic fibers are subject to oxidation, the oxidation of the ceramic matrix and the inorganic fibers are protected surely from oxidation and hence a main cause of the reduction of the high-temperature strength and the oxidation resistance of the glass-impregnated, fiber-reinforced ceramic is eliminated. Accordingly, the high-temperature strength and the oxidation resistance of the glass-impregnated, fiber-reinforced ceramic of the present invention are far higher than those of the conventional fiber-reinforced ceramic not impregnated with glass. Since the cause of reduction of the strength due to the notch effect of the voids can be eliminated by the densifying effect of the impregnation with glass, the room temperature strength of the glass-impregnated, fiber-reinforced ceramic of the present invention is far higher than that of the conventional fiber-reinforced ceramic.

The glass matrix may be one of $AlPO_4$, $PbO$, $ZnO$, $SiO_2$, $B_2O_3$, $Al_2O_3$, $Na_2O$, $CaO$, $MgO$, $Li_2O$ and $K_2O$ or a combination of some of those substances. A material of an appropriate composition having an appropriate softening point can be used as the glass matrix according to the temperature of the atmosphere in which the glass-impregnated, fiber-reinforced ceramic of the present invention is to be used because the glass matrix may be one of those substances or a combination of some of those substances. Therefore, voids can be effectively stopped up with the glass matrix at a working temperature and the glass matrix is able to exercise its oxygen intercepting effect effectively in a wide temperature range.

According to a second aspect of the present invention, a method for manufacturing a glass-impregnated, fiber-reinforced ceramic, comprising the steps of: producing a fiber-reinforced ceramic including a ceramic matrix having voids opening outside and inorganic fibers embedded in the ceramic matrix; impregnating the fiber-reinforced ceramic with glass precursor solution containing glass precursor to fill the voids of the ceramic matrix with the glass precursor solution; and subjecting the fiber-reinforced ceramic impregnated with the glass precursor solution to heat treatment.

The fiber-reinforced ceramic can be surely and quickly impregnated with the glass precursor solution containing a glass precursor which can be vitrified by thermal decomposition by immersing the fiber-reinforced ceramic in the glass precursor solution under a vacuum atmosphere. When the fiber-reinforced ceramic thus impregnated with the glass precursor solution is subjected to a heat treatment, the glass precursor is vitrified by thermal decomposition to form the glass matrix in the voids. Thus, the glass-impregnated, fiber-reinforced ceramic can be efficiently manufactured by simple processes.

The impregnating step of the fiber-reinforced ceramic with the glass precursor solution and the heating treatment of the fiber-reinforced ceramic impregnated with the glass precursor solution may be alternately repeated several times. If the impregnating process and the heating process are repeated alternately several times, the number of voids formed by the dissipation of components of the glass precursor solution filling up the voids in the fiber-reinforced ceramic caused by the heating process decreases gradually to increase the void filling ratio of the glass matrix greatly. Consequently, the oxygen intercepting effect and the densifying effect of the glass matrix are further enhanced.

The producing step of the fiber-reinforced ceramic may include depositing ceramic material by a chemical vapor deposition (CVD) process on the inorganic fiber to form the ceramic matrix. The fiber-reinforced ceramic can be formed in a thin structure by thus depositing the ceramic matrix on the inorganic fibers.

According to a third aspect of the present invention, a method for manufacturing a glass-impregnated, fiber-reinforced ceramic, includes the steps of: producing a fiber-reinforced ceramic having a ceramic matrix having voids opening outside and inorganic fibers embedded in the ceramic matrix; and impregnating the fiber-reinforced ceramic with molten glass to fill the voids of the ceramic matrix with the molten glass.

When impregnating the fiber-reinforced ceramic with the molten glass, the fiber-reinforced ceramic is immersed in the molten glass in a vacuum atmosphere to stop up the voids in the fiber-reinforced ceramic. Therefore, the fiber-reinforced ceramic can be quickly and surely filled with the molten glass. Since the fiber-reinforced ceramic can be impregnated with the molten glass by a single process, the glass-impregnated, fiber-reinforced ceramic manufacturing method needs a small number of processes and the glass-impregnated, fiber-reinforced ceramic can be efficiently manufactured.

The impregnating step of the fiber-reinforced ceramic with the molten glass may be repeated for several times. If the impregnation process is repeated several times, the void filling ratio of the glass matrix increases greatly, which further enhances the oxygen intercepting effect and the densifying effect of the glass matrix.

BRIEF DESCRIPTION OF THE DRAWINGS

The above and other objects, features and advantages of the present invention will become more apparent from the following description taken in connection with the accompanying drawings, in which:

FIG. 1 is a typical sectional view of a glass-impregnated, fiber-reinforced ceramic in a preferred embodiment according to the present invention;

FIG. 2A, FIG. 2B, FIG. 2C, FIG. 2D and FIG. 2E are typical views of assistance in explaining the orientations of inorganic fibers in the glass-impregnated fiber-reinforced ceramic;

DESCRIPTION OF THE PREFERRED EMBODIMENTS

Figure 2D:
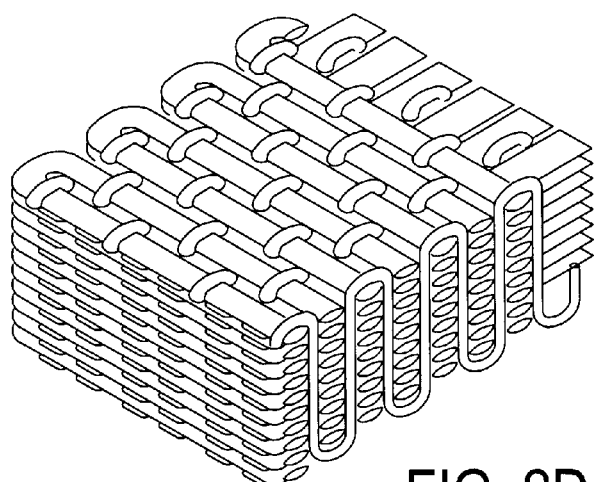
Figure 2E:
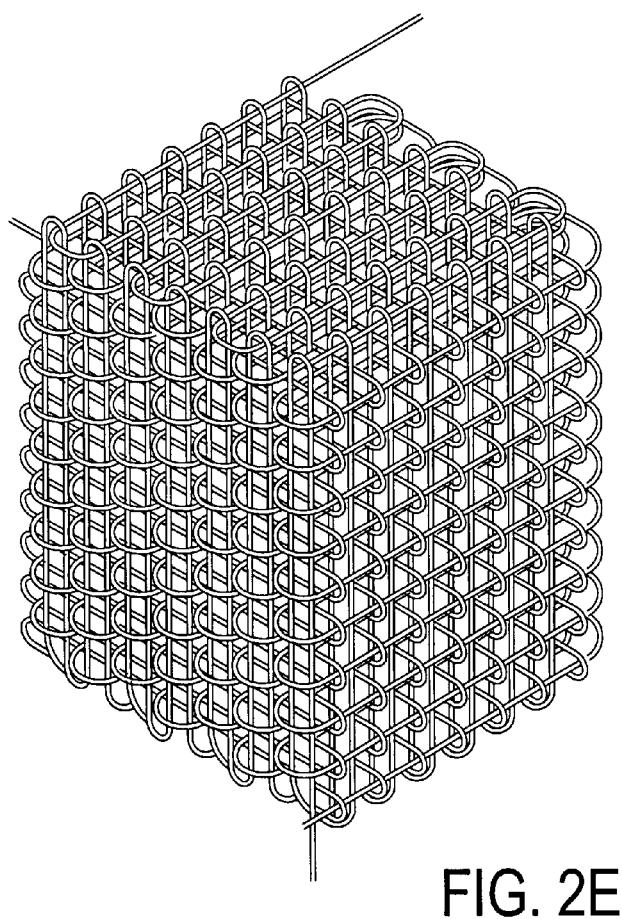

Referring to FIG. 1 showing a glass-impregnated, fiber-reinforced ceramic 7 (hereinafter referred to in some cases as "glass-impregnated FRC") in a first embodiment according to the present invention in a typical sectional view, the glass-impregnated, fiber-reinforced ceramic 7 includes a ceramic matrix 9, inorganic fibers 8 embedded in the ceramic matrix 9, and a glass matrix 10. The glass-impregnated, fiber-reinforced ceramic 7 is a structural material to be used in a hot oxidizing atmosphere. The inorganic fibers 8 are reinforcing components for enhancing the strength and the toughness of the glass-impregnated FRC 7. Silicon carbide filament, carbon filaments and alumina filaments are suitable for use as the inorganic fibers 8. The arrangement and orientation of the inorganic fibers 8 are dependent on expected directions of action of forces that will be exerted on the glass-impregnated, fiber-reinforced ceramic 7. If forces are expected to act on the glass-impregnated FRC 7 in two directions perpendicular to each other, the inorganic fibers 8 are arranged in a two-dimensional structure similarly to the component yarns of a two-axis, two-dimensional woven fabric in which the component yarns intersect each other perpendicularly in a plane as shown in FIG. 2A. The inorganic fibers 8 may be arranged in a two-dimensional structure similarly to the component yarns of a one-axis two-dimensional woven fabric in which the component yarns extend in parallel to each other in the same direction in a plane as shown in FIG. 2B or may be arranged in a two-dimensional structure similarly to the component yarns of a three-axis two-dimensional woven fabric in which the component yarns extend in three directions intersecting each other at predetermined angles in a plane as shown in FIG. 2C. A plurality of two-dimensional structures like any one of the two-dimensional structures of the inorganic fibers 8 shown in FIGS. 2A, 2B and 2C are laminated. The inorganic fibers 8 may be arranged in a three-dimensional structure similarly to the component yarns of a three-dimensional woven fabric or may be extended in a random arrangement. In this embodiment, a three-axis three-dimensional woven fabric of silicon carbide filaments is employed as shown in FIG. 2D and 2E.

The ceramic matrix 9 is a mass in which the inorganic fibers 8 are embedded. Suitable substances for use as the ceramic matrix 9 are, for example, silicon nitride, silicon carbide, mullite, zirconia, and titanium carbide. In this embodiment, the ceramic matrix 9 is silicon carbide. It is difficult, from the view point of manufacturing techniques, to densify the ceramic matrix 9 perfectly. The brittle ceramic matrix 9 is liable to be cracked by stress induced therein during manufacture. Therefore, voids are formed unavoidably in the ceramic matrix 9 and some of the voids are open outside. The porosity of the ceramic matrix 9 is in the range of 5 to 30%.

The glass matrix 10 is a basic material filling up at least the voids in the ceramic matrix 9. The glass matrix 10 fills up the voids in the ceramic matrix 9, densifies the ceramic matrix 9 and smoothes the outer and inner surfaces of the ceramic matrix 9. Preferably, the glass matrix 10 is one of $AlPO_4$, PbO, ZnO, $SiO_2$, $B_2O_3$, $Al_2O_3$, $Na_2O$, CaO, MgO, $Li_2O$ and $K_2O$ or a combination of some of those substances. In this embodiment, the glass matrix 10 is an $Na_2O$—$SiO_2$ glass.

Since voids in the ceramic matrix 9 are stopped up closely with the glass matrix 10, the inorganic fibers 8 and the ceramic matrix 9 are insulated from oxygen contained in the atmosphere surrounding the glass-impregnated FRC 7. Therefore, the oxidation of the inorganic fibers 8 and the ceramic matrix 9 is prevented even if the inorganic fibers 8 and the ceramic matrix 9 are easily oxidizable substances, even if the glass-impregnated FRC 7 is used in a hot oxidizing atmosphere. Usually, the high-temperature strength of FRCs formed from carbon, silicon carbide and silicon nitride is reduced by oxidation as mentioned above. Therefore, even if the ceramic matrix 9 and the inorganic fibers 8 are subject to oxidation, the oxidation of the ceramic matrix 9 and the inorganic fibers 8 are protected surely from oxidation and hence a main cause of the reduction of the high-temperature strength of the glass-impregnated FRC 7 is eliminated. Accordingly, the high-temperature strength and the oxidation resistance of the glass-impregnated FRC 7 are far higher than those of the conventional FRC not impregnated with glass. Since a main cause of strength reduction attributable to the notch effect of voids in the ceramic matrix 9 can be eliminated by the densifying effect and the surface smoothing effect of impregnation with the glass, the room temperature strength of the glass-impregnated FRC 7 is far higher than that of the conventional FRC. The characteristics of the glass-impregnated FRC 7 and the conventional FRC will be specifically described later.

The glass matrix 10 is one of a plurality of vitreous materials or a combination of some of those vitreous materials. The composition of the glass matrix 10 is determined selectively so that the glass matrix 10 has an appropriate softening point for the working temperature of an atmosphere in which the glass-impregnated FRC 7 is to be used. Therefore, even if the ceramic matrix or the glass matrix 10 is cracked, the glass matrix 10 is softened and flows at a working temperature so that the glass matrix 10 is repaired if the composition of the glass matrix 10 is determined properly. Consequently, voids can be surely stopped up with the glass matrix 10 and the glass matrix 10 is able to exercise its oxygen intercepting effect effectively in a wide temperature range.

A method of manufacturing the glass-impregnated fiber-reinforced ceramic 7 shown in FIG. 1 will be described with reference to FIG. 3. In step a1, a three-axis three-dimensional inorganic fiber structure is built by weaving the inorganic fibers 8, namely, silicon carbide filaments in this embodiment. In step a2, the inorganic fiber structure is impregnated with a ceramic precursor by immersing the inorganic fiber structure in a ceramic precursor solution containing the ceramic precursor to form a preform, i.e., the inorganic fiber structure thus impregnated with the ceramic precursor solution. The ceramic precursor is converted into a ceramic material by thermal decomposition. In this embodiment, the ceramic precursor is polycarbosilane. The ceramic precursor solution is prepared by dissolving polycarbosilane in xylene as a solvent and has a polycarbosilane concentration of, for example, 60% by weight.

In step a3, the preform is subjected to a primary firing process. For example, the preform is fired at a high temperature of 1000° C. for 5 hr in an argon atmosphere in a firing furnace in the primary firing process. Consequently, the ceramic precursor is converted into the ceramic matrix 9 by the primary firing process to form the fiber-reinforced ceramic.

In step a4, the fiber-reinforced ceramic having the inorganic fibers 8 and the ceramic matrix 9 and fired by the primary firing process is subjected to a densifying process, in which the preform having the ceramic matrix 9 is immersed in and impregnated with a ceramic precursor solution (50% by weight polycarbosilane/xylene solution) to fill up voids remaining in the preform after the first firing process with the ceramic precursor solution for densification. In the densifying process, the preform is processed at 160° C. for 1 hr in a nitrogen gas atmosphere of 9 kg/cm² in pressure. Consequently, the voids remaining in the preform after the primary firing process are filled up with the ceramic precursor solution for densification.

In step a5, the preform thus impregnated again with the ceramic precursor solution for densification is subjected to a secondary firing process. Conditions for the secondary firing process are the same as those for the primary firing process. The ceramic precursor is converted into a ceramic matrix to form an FRC having the inorganic fibers 8 and the ceramic matrix 9. If necessary, the densifying process and the secondary firing process are repeated several times for further densification to increase the void filling ratio of the ceramic matrix 9. However, it is practically impossible to stop up the voids perfectly with the ceramic matrix 9 because the components of the ceramic precursor excluding those which are converted into the ceramic matrix 9 are dissipated by heat during the secondary firing process. Since the ceramic matrix 9 is liable to be cracked by thermal stress during cooling after firing, voids are formed unavoidably in the ceramic matrix 9 and some of those voids are open gaps.

The foregoing steps a2 to a5 may be substituted by step a9 which forms the ceramic matrix 9 on the inorganic fibers 8 by chemical vapor deposition (CVD). The step a9 is effective in manufacturing a thin ceramic matrix.

In step a6, the FRC having the inorganic fibers 8 and the densified ceramic matrix 9 is subjected to an impregnation process of impregnating the FRC with a glass precursor solution to stop up voids in the ceramic matrix 9. In the impregnation process, the FRC is processed by processing steps of conditions tabulated in Table 1.

TABLE 1

| No. | Processes and processing conditions |
|---|---|
| 1 | Ultrasonic cleaning using acetone |
| 2 | Drying at 100° C. for 12 hr |
| 3 | Immersion of the FRC in a glass precursor solution |
| 4 | Deformation and impregnation of the FRC in a vacuum vessel |
| 5 | Removal of the FRC from the vessel |
| 6 | Removal of excessive glass precursor with a brush |

The glass precursor contained in the glass precursor solution is vitrified by thermal decomposition by a heat treatment. In this embodiment, the glass precursor solution is an $Na_2O$—$SiO_2$ solution. The voids in the ceramic matrix 9 can be quickly and surely filled up with the glass precursor solution in a vacuum atmosphere. The surfaces of the FRC also are coated with the glass precursor solution.

In step a7, the FRC impregnated with the glass precursor solution is subjected to a heating process, in which the FRC impregnated with the glass precursor solution is processed by steps of processing conditions tabulated in Table 2.

TABLE 2

| No. | Process | Heat processing conditions |
|---|---|---|
| 1 | Air drying | 12 hr |
| 2 | Curing | 90° C. × 2 hr + 150° C. × 1 hr in air |
| 3 | Vitrification | 850° C. × 2 hr in an inert gas |

When the FRC impregnated with the glass precursor solution is thus processed by the heating process at a temperature higher than the glass temperature, the glass precursor contained in the glass precursor solution is vitrified by thermal decomposition to form the glass matrix filling up the voids and coating the surfaces of the FRC. Since the components of the glass precursor solution excluding those which are vitrified are dissipated by heating, voids are formed after the heating process even if the voids in the FRC is filled up completely before the heating process. Therefore, it is preferable to repeat step a6 for the impregnation process and step a7 for the heating process several times to increase the void filling ratio of the glass matrix 10 and to enhance the oxygen intercepting effect of the glass matrix 10 greatly. Consequently, the glass-impregnated FRC 7 has a greatly improved oxidation resistance. In step a8, the glass-impregnated FRC 7 is completed.

The method of manufacturing the glass-impregnated FRC 7 of the present invention is very simple and is capable of easily manufacturing the glass-impregnated FRC 7 at a low manufacturing cost. Although the foregoing method forms the FRC by impregnating the inorganic fiber structure with the ceramic precursor solution and firing the preform, the FRC may be formed by methods other than the foregoing method, For example, the FRC may be formed by a method which constructs a preform by inorganic fibers impregnated with a ceramic precursor solution and fires the preform or by a method which impregnates inorganic fiber structure with a molten ceramic, and fires the preform.

The strength characteristics of the glass-impregnated FRC will be specifically explained hereinafter. The strength characteristics of glass-impregnated FRCs in Examples 1 and 2 according to the present invention and those of conventional FRCs in Comparative examples 1 and 2 are tabulated comparatively in Table 3. The glass-impregnated FRC in Example 1 was manufactured by a method which carries out one cycle of the impregnation process and the subsequent heating process, and the glass-impregnated FRC in Example 2 was manufactured by a method which carries out three cycles each of the impregnation process and the subsequent heating process. The conventional FRC in Comparative example 1 was not impregnated with glass, and the conventional glass-coated FRC in Comparative example 2 was manufactured by coating the surfaces of the FRC with a glass precursor solution by brushing, and subjecting the FRC coated with the glass precursor solution to a heating process. In Table 3, room bending strength, namely, bending strength at room temperature was measured according to a bending strength testing method specified in JIS R 1601, and high-temperature bending strength was measured at 1200° C. in a hot oxidizing atmosphere. Strength retention ratio is the ratio of high-temperature bending strength to room temperature bending strength.

TABLE 3

| | Com. Example 1 | Com. Example 2 | Example of the present invention 1 | Example of the present invention 2 |
|---|---|---|---|---|
| Glass treatment | None | Brushing | Impregnation, twice | Impregnation, 3 times |
| Room temperature bending strength (MPa) | 638 | 689 | 720 | 788 |
| Strength augmenting ratio (%) (compared with the not treated example) | 0 | 8.2 | 13 | 24 |
| High-temperature bending strength (MPa) | 144 | 340 | 416 | 683 |

TABLE 3-continued

|  | Com. Example 1 | Com. Example 2 | Example of the present invention 1 | Example of the present invention 2 |
|---|---|---|---|---|
| Strength retention ratio (%) (compared with the strength in room temperature) | 23 | 49 | 58 | 87 |

As is obvious from Table 3, the room temperature bending strength, the high-temperature bending strength and the strength retention ratio of Example of the present invention are far greater than those of Comparative example 1 and greater than those of Comparative example 2, and the room temperature bending strength, and the high-temperature bending strength and the strength retention ratio of Example 2 of the present invention having a high void filling ratio are greater than those of Example 1 of the present invention. The high-temperature bending strength and the strength retention ratio of the glass-impregnated FRC in a hot oxidizing atmosphere are enhanced greatly by impregnation with glass because the oxygen intercepting effect of the glass matrix prevents the oxidation of the inorganic fibers 8 and the ceramic matrix 9 and eliminates the cause of strength reduction attributable to the formation of oxides. The room temperature bending strength is increased by impregnation with glass because the densifying effect and surface smoothing effect of the glass matrix eliminates a main cause of strength reduction attributable to the notch effect of voids in the ceramic matrix 9. Thus, the glass-impregnated FRC of the present invention has a high room temperature bending strength, and a high high-temperature bending strength in a hot oxidizing atmosphere owing to its excellent oxidation resistance. Accordingly, the glass-impregnated FRC of the present invention can be widely used in a wide temperature range as a structural material.

Figure 4:
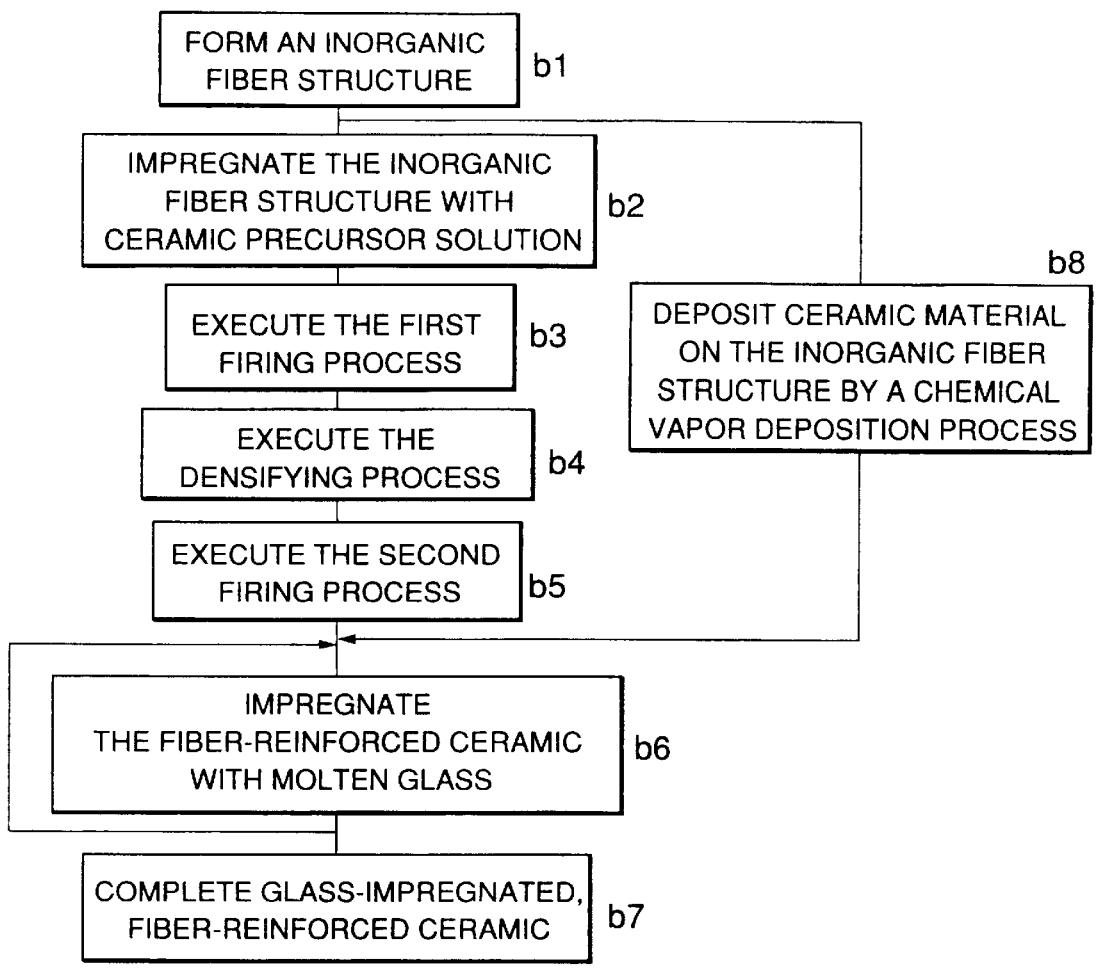
FIG. 4 is a flow chart of another method of manufacturing the glass-impregnated, fiber-reinforced ceramic of FIG. 1.
Figure 5:
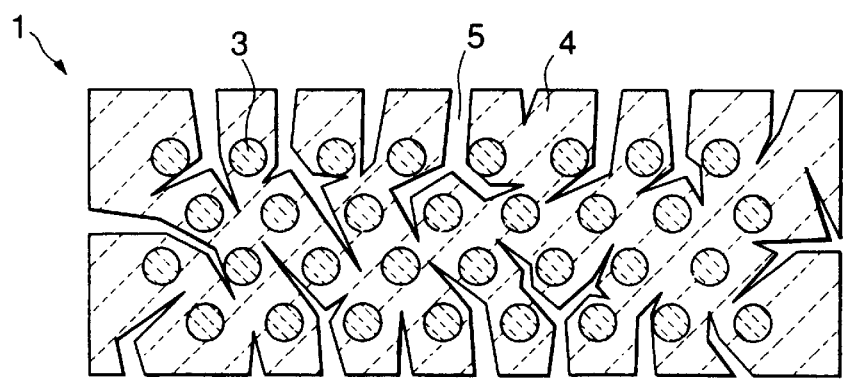
FIG. 5 is a typical sectional view of a fiber-reinforced ceramic produced by conventional art.

FIG. 4 is a flow chart of assistance in explaining another method of manufacturing the glass-impregnated fiber-reinforced ceramic shown in FIG. 1. The FRC having the inorganic fibers 8 and the ceramic matrix 9 is formed by steps b1 to b5 or by step b8. Processes to be carried out in steps b1 to b5 are the same as those to be carried out in steps a1 to a5, and a process to be carried out in step b8 is the same as that to be carried out in step a9 and hence the description thereof will be omitted to avoid duplication. In step b6, a molten glass impregnation process is carried out to impregnate the ceramic matrix 9 with molten glass so that voids in the ceramic matrix 9 are stopped up with the molten glass. In the molten glass impregnation process, glass powder is melted by heating, the FRC is immersed in the molten glass in a vacuum atmosphere. The molten glass is a molten $Na_2O$—$SiO_2$ glass. Since the molten glass impregnation process is carried out in a vacuum atmosphere, the molten glass permeates the FRC and fills up the voids quickly and surely. The molten glass impregnation process may be repeated several times to improve the void filling ratio of the molten glass. In step b7, the glass-impregnated FRC is completed. This method impregnates the FRC by a single impregnation process and hence the number of steps of the manufacturing process can be reduced and the glass-impregnated FRC can be efficiently manufactured.

Figure 3:
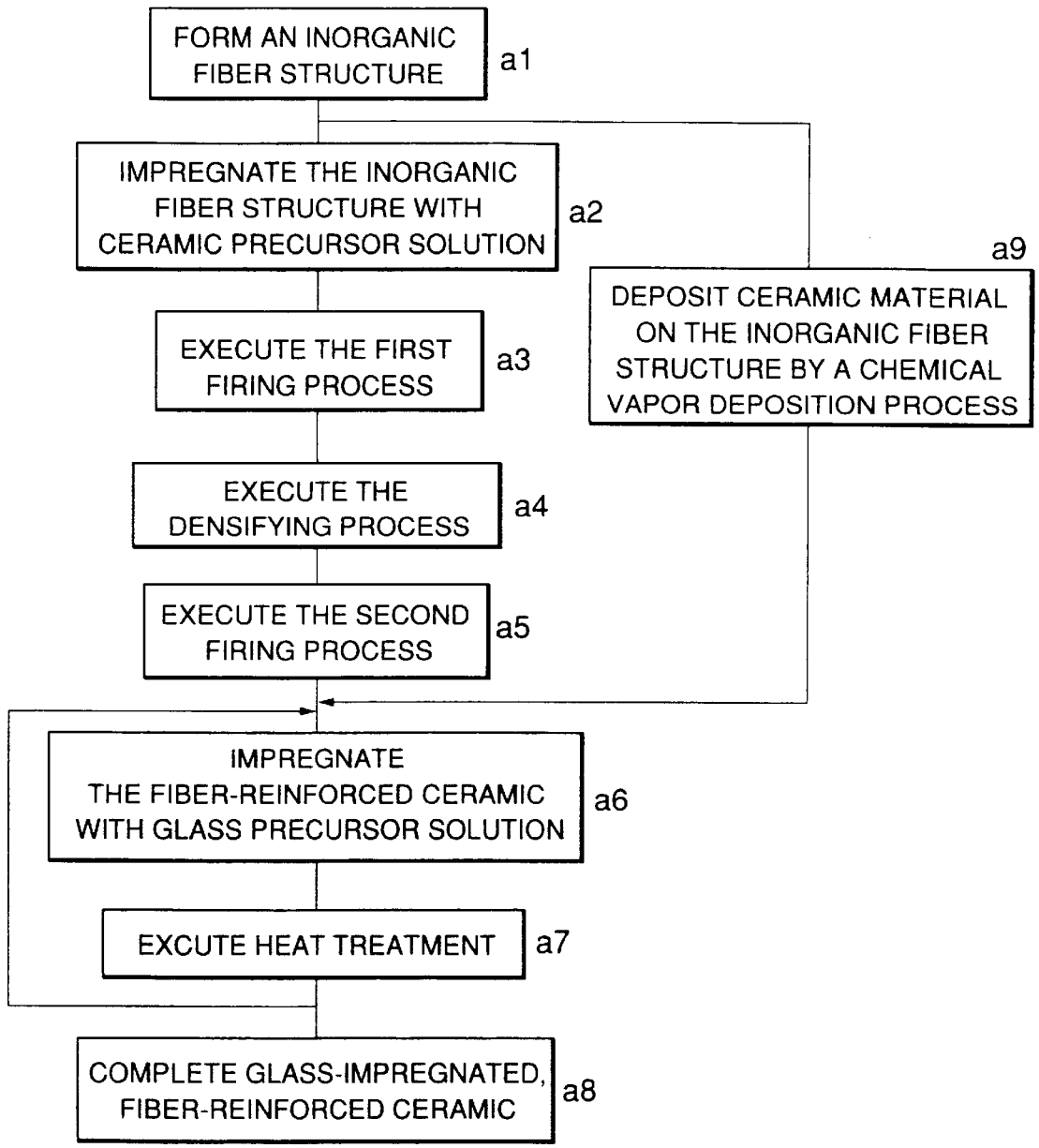
FIG. 3 is a flow chart of a method of manufacturing the glass-impregnated, fiber-reinforced ceramic of FIG. 1.

Although the method shown in FIG. 3 impregnates the FRC with the glass precursor solution by immersing the FRC in the glass precursor solution and reduces the pressure of the atmosphere, and the method shown in FIG. 4 impregnates the FRC with the molten glass by immersing the FRC in the molten glass and reduces the pressure of the atmosphere, the FRC may be impregnated with glass by any one of the following methods.

(1) A method which immerses the FRC in the glass precursor solution or the molten glass, and increases the pressure of the atmosphere (2) A method which degases the FRC in a vacuum by suction and immerses the degassed FRC in the glass precursor solution or the molten glass (3) A method which increases the pressure of the atmosphere after impregnating the FRC with the glass precursor solution or the molten glass by the method mentioned in (2)

As is apparent from the foregoing description, the glass-impregnated FRC 7 of the present invention has excellent oxidation resistance in a hot oxidizing atmosphere owing to its oxygen intercepting effect of the glass matrix 10. Accordingly, the present invention is particularly effective when the component inorganic fibers 8 and the component ceramic matrix 9 of the glass-impregnated FRC 7 are formed from easily oxidizable substances. Even if the component inorganic fibers 8 and the component ceramic matrix 9 are formed from originally highly oxidation resistant oxide ceramic materials, the densifying effect and the surface smoothing effect of the glass matrix 10 enhances the room temperature bending strength greatly. The present invention is applicable to glass-impregnated FRCs employing a ceramic matrix of an oxide.

Although the invention has been described in its preferred form with a certain degree of particularity, obviously many changes and variations are possible therein. It is therefore to be understood that the present invention may be practiced otherwise than as specifically described herein without departing from the scope and spirit thereof.

What is claimed is:

1. A method of manufacturing a glass-impregnated, fiber-reinforced ceramic, comprising:

forming a three-dimensional inorganic fiber structure including a plurality of inorganic fibers and a space among the inorganic fibers, the plurality of inorganic fibers being arranged in the inorganic fiber structure in a three-dimensional woven fabric with respect to each other;

producing a fiber-reinforced ceramic by filling the space with a ceramic matrix, the fiber-reinforced ceramic including the ceramic matrix having voids opening to the outside and the inorganic fiber structure embedded in the ceramic matrix;

impregnating the fiber-reinforced ceramic with glass precursor solution containing glass precursor to fill the voids of the ceramic matrix with the glass precursor solution;

heat treating the fiber-reinforced ceramic impregnated with the glass precursor solution; and repeating the impregnating of the fiber-reinforced ceramic with the glass precursor solution and the heat treating of the fiber-reinforced ceramic impregnated with the glass precursor solution a plurality of times.

2. The method of claim 1, wherein the producing of the fiber-reinforced ceramic comprises depositing ceramic material by a chemical vapor deposition process on the inorganic fibers to form the ceramic matrix.

3. The method of claim 1, wherein the glass precursor comprises at least one substance selected from the group consisting of $AlPO_4$, PbO, ZnO, $SiO_2$, $B_2O_3$, $Al_2O_3$, $Na_2O$, CaO, MgO, $Li_2O$ and $K_2O$.

4. The method of claim 1, wherein the glass precursor consists essentially of at least one substance selected from the group consisting of $AlPO_4$, PbO, ZnO, $SiO_2$, $B_2O_3$, $Al_2O_3$, $Na_2O$, CaO, MgO, $Li_2O$ and $K_2O$.

5. The method of claim 1, wherein a glass matrix is formed covering at least a portion of an outer surface of the ceramic matrix.

6. The method of claim 5, wherein the glass matrix covers the entire outer surface of the ceramic matrix.

7. The method of claim 1, wherein the glass precursor is impregnated into the voids of the ceramic matrix in a vacuum atmosphere.

8. The method of claim 1, wherein the inorganic fibers include first inorganic fibers arranged in parallel in a first direction and second inorganic fibers arranged in parallel in a second direction perpendicular to the first direction.

9. The method of claim 1, wherein the inorganic fibers include inorganic fibers arranged in parallel to each other.

10. The method of claim 1, wherein the inorganic fibers include first inorganic fibers arranged in parallel in a first direction, second inorganic fibers arranged in parallel in a second direction, and third inorganic fibers arranged in parallel in a third direction, and the first, second and third inorganic fibers intersecting each other.

11. A method of manufacturing a glass-impregnated, fiber-reinforced ceramic, comprising:

forming an inorganic fiber structure including a plurality of inorganic fibers and a space among the inorganic fibers, the plurality of inorganic fibers being arranged in the inorganic fiber structure in a three-dimensional woven fabric with respect to each other;

producing a fiber-reinforced ceramic by filling the space with a ceramic matrix, the fiber-reinforced ceramic including the ceramic matrix having voids opening to the outside and the inorganic fiber structure embedded in the ceramic matrix;

impregnating the fiber-reinforced ceramic with molten glass to fill the voids of the ceramic matrix with the molten glass; and repeating the impregnating of the fiber-reinforced ceramic with the molten glass is repeated a plurality of times.

12. The method of claim 11, wherein the producing of the fiber-reinforced ceramic comprises depositing ceramic material by a chemical vapor deposition process on the inorganic fibers to form the ceramic matrix.

13. The method of claim 11, wherein the molten glass comprises at least one substance selected from the group consisting of $AlPO_4$, PbO, ZnO, $SiO_2$, $B_2O_3$, $Al_2O_3$, $Na_2O$, CaO, MgO, $Li_2O$ and $K_2O$.

14. The method of claim 11, wherein the molten glass consists essentially of at least one substance selected from the group consisting of $AlPO_4$, PbO, ZnO, $SiO_2$, $B_2O_3$, $Al_2O_3$, $Na_2O$, CaO, MgO, $Li_2O$ and $K_2O$.

15. The method of claim 11, wherein the glass covers at least a portion of an outer surface of the ceramic matrix.

16. The method of claim 15, wherein the glass matrix covers the entire outer surface of the ceramic matrix.

17. The method of claim 11, wherein the molten glass is impregnated into the voids of the ceramic matrix in a vacuum atmosphere.

18. The method of claim 11, wherein the inorganic fibers include first inorganic fibers arranged in parallel in a first direction and second inorganic fibers arranged in parallel in a second direction perpendicular to the first direction.

19. The method of claim 11, wherein the inorganic fibers include inorganic fibers arranged in parallel to each other.

20. The method of claim 11, wherein the inorganic fibers include first inorganic fibers arranged in parallel in a first direction, second inorganic fibers arranged in parallel in a second direction, and third inorganic fibers arranged in parallel in a third direction, and the first, second and third inorganic fibers intersecting each other.

* * * * *